US00RE34670E

United States Patent [19]

Williams et al.

[11] E Patent Number: Re. 34,670

[45] Reissued Date of Patent: Jul. 26, 1994

[54] INOCULANT COMPOSITION FOR PLANTS

[75] Inventors: Paul M. Williams; John M. Day, both of Harpenden, England

[73] Assignee: Agricultural Genetics Company Limited, Cambridge, United Kingdom

[21] Appl. No.: 818,472

[22] Filed: Jan. 6, 1992

Related U.S. Patent Documents

Reissue of:

[64] Patent No.: 4,849,005
Issued: Jul. 18, 1989
Appl. No.: 74,543
Filed: Jul. 17, 1987

U.S. Applications:

[63] Continuation of Ser. No. 516,738, Apr. 30, 1990, abandoned.

[30] Foreign Application Priority Data

Jul. 17, 1986 [GB] United Kingdom ..... 8617496

[51] Int. Cl.[5] ..... C05F 11/08

[52] U.S. Cl. ..... 71/7; 71/23; 71/27; 71/904

[56] References Cited

U.S. PATENT DOCUMENTS

| | | | |
|---|---|---|---|
| 3,867,324 | 2/1975 | Clendinning et al. | 523/126 |
| 3,901,838 | 8/1975 | Clendinning et al. | 523/126 |
| 3,991,517 | 11/1976 | Lewis | 47/57.6 |
| 4,081,366 | 3/1978 | O'Donnell | 210/725 |
| 4,094,097 | 6/1978 | Alexander | 504/100 |
| 4,130,517 | 12/1978 | Lundberg | 524/606 |
| 4,155,737 | 5/1979 | Dommergues et al. | 71/7 |
| 4,272,417 | 6/1981 | Barke et al. | 523/122 |
| 4,306,027 | 12/1981 | Alexander et al. | 435/252.2 |
| 4,434,231 | 2/1984 | Jung | 435/178 |
| 4,438,593 | 3/1984 | McNew et al. | 504/100 |
| 4,517,008 | 5/1985 | Strobel et al. | 504/100 |
| 4,755,468 | 7/1988 | Jung | 435/178 |

FOREIGN PATENT DOCUMENTS

| | | |
|---|---|---|
| 0017193 | 3/1980 | European Pat. Off. . |
| 3247918 | 6/1984 | Fed. Rep. of Germany . |
| 2080669 | 2/1982 | United Kingdom . |

OTHER PUBLICATIONS

CRC Handbook of Chemistry and Physics, 60th Ed. 1979–1980, C-86 and C-500.

Howieson, et al. "Inoculation and lime pelleting of medic seed", Western Australia Dept. of Agriculture, ISSN 0726-934X (date uncertain).

*Corpus Chemical Report*, Jun. 4, 1984, p. 4.

PVP in Seed Coating, J. T. Hudson, Feb. 10, 1984.

Seed Coating Applications, Ellen H. Werner, Jun. 1982, GAF Corporation.

*Primary Examiner*—Ferris Lander

*Attorney, Agent, or Firm*—Oblon, Spivak, McClelland, Maier & Neustadt

[57] ABSTRACT

The invention relates to an inoculant composition for plants, comprising a carrier medium, at least one species of microorganism having a beneficial effect on the plants, and a copolymer of (1) vinyl pyrrolidone and (2) vinyl acetate or styrene or substituted styrene.

15 Claims, No Drawings

INOCULANT COMPOSITION FOR PLANTS

Matter enclosed in heavy brackets [ ] appears in the original patent but forms no part of this reissue specification; matter printed in italics indicates the additions made by reissue.

*This application is a continuation of application Ser. No. 07/516,738, filed Apr. 30, 1990, now abandoned, which is a reissue of Ser. No. 07/074,543, filed Jul. 17, 1987, now U.S. Pat. No. 4,849,005.*

This invention relates to an inoculant composition for plants.

TITLE OF THE INVENTION

The term "plants" includes all agricultural crop plants, horticultural plants, trees and bushes.

BACKGROUND OF THE INVENTION

Various microorganisms are known to have a beneficial effect on plants, e.g. bacteria of the general Rhizobium. Bacillus, Azotobacter, Arthrobacter, Pseudomonas, Azospirillum and Cyanobacteria (blue-green algae), and mycorrhizal fungae. Such microorganisms are introduced to the plants by the use of inoculant compositions. Although the following description is mainly concerned with Rhizobium inoculant compositions, it will be appreciated that similar principles apply to the use of other microorganisms.

FIELD OF THE INVENTION

It is well known that legume crops can fix atmospheric nitrogen when in association with Rhizobium bacteria which reside within nodules on the plant roots. There are many different species and strains of Rhizobium bacteria. There are specific beneficial strains for each crop, and these will not necessarily effectively nodulate a different crop. Most soils do contain a natural rhizobial population, but wild strains are often ineffective. Successful nodulation depends on the presence of an effective rhizobial strain in the soil, and moreover this strain needs to be sufficiently competitive within the soil environment to enable it to compete successfully with the wild population. The only way to ensure that an effective strain of Rhizobium will associate with the crop is to inoculate the seed, or the soil, at the time of sowing.

Rhizobium inoculant compositions are known which contain appropriate rhizobial strains together with a suitable carrier medium. A preferred carrier medium is peat. The inoculant is placed in intimate contact with the seed to ensure rapid and effective nodulation of the young crop plants. This may be achieved by two general methods, slurry inoculation and dry inoculation. In slurry inoculation, the inoculant is mixed with water and generally a "sticker", e.g. gum arabic or methyl cellulose, to improve adhesion to the seed. This suspension is then mixed thoroughly with the seeds to ensure that all the seeds are coated before sowing. In dry inoculation, the inoculant composition is simply mixed with the seeds in the drill hopper immediately before sowing.

Slurry inoculation is often disliked by farmers as they fear seeds may become partially imbibed during the process and, if subsequently sown into dry soils, their viability may be adversely affected. The procedure is also very dirty, usually involving hand mixing of a thick black suspension prior to seed application. Therefore, considerable interest exists in dry inoculation methods, but unfortunately only low bacterial numbers can be achieved owing to poor adhesion of the peat particles to the seed coat.

SUMMARY OF THE INVENTION

GB-A-2 080 669 proposes the use of a water-soluble polyvinyl pyrrolidone in Rhizobium inoculants. The water-soluble polyvinyl pyrrolidone is stated to promote the survival of the microorganism.

SUMMARY OF THE INVENTION

Although water-soluble polyvinyl pyrrolidone has been found to promote the adhesion of inoculant compositions to legume seeds to a certain extent, the effect is not as great as may be desired. We have surprisingly found that the use of a copolymer of vinyl pyrrolidone and vinyl acetate, in which the proportion of vinyl acetate tends to decrease the water solubility of the copolymer, has an unexpectedly great effect in increasing the adhesion of the inoculant composition to a wide range of legume seeds.

We have found similar effects with the use of a copolymer of vinyl pyrrolidone and styrene or a substituted styrene.

DETAILED DESCRIPTION OF THE PREFERERD EMBODIMENTS

The present invention thus provides an inoculant composition for plants, comprising a carrier medium, at least one species of microorganism having a beneficial effect on the plants, and a copolymer of (1) vinyl pyrrolidone and (2) vinyl acetate of styrene or a substituted styrene (e.g. methyl styrene).

Preferably, the plants are legume crops and the microorganism is Rhizobium bacteria.

The carrier medium is preferably peat, in particular irradiated sedge peat.

A preferred copolymer for use in the present invention contains vinyl pyrrolidone and vinyl acetate in respective proportions by weight of from 50:50 to 70:30, most preferably about 60:40.

The invention also provides a seed having a coating comprising at least one species of microorganism having a beneficial effect on the seed or resulting plant, and a copolymer of (1) vinyl pyrroldione and (2) vinyl acetate or styrene or a substituted styrene.

The invention further provides a method of sowing seeds, in which the seeds are sown together with an inoculant composition as defined above. The inoculant composition may be applied either to the seeds or to the soil at the time of sowing.

The inoculant compositions according to this invention may be used for the inoculation of dry seeds or they may be slurried with water when this type of inoculation is desired.

The invention is illustrated by the following Examples.

EXAMPLE 1

Inoculant compositions were prepared by mixing samples of peat with various polymers to make a total weight of 150 g in each case, followed by injecting with 110 ml of Rhizobium broth and curing for seven days prior to use, 0.5 g of each inoculant composition was then mixed dry with 100 g of legume (soya) seeds. The seeds were then separated from excess inoculant, and the weight of inoculant adhering to the seeds was measured. The results are shown in Table 1 below.

TABLE 1

| Additive (additive - peat 150 g) | Wt. of inoculant adhering to 100 g seed (mg) |
|---|---|
| Control (no additive) | 121 |
| 5 g PVP (M.W. 10,000) | 172 |
| 5 g PVP (44,000) | 248 |
| 5 g PVP (700,000) | 104 |
| 5 g PVP VA-S-630 | 297 |
| 5 g Antara 430 | 185 |
| 5 g PVP/VA-S-630 after storage* | 230 |
| Control after storage* | 112 |

*Storage for 14 months at laboratory temperature

PCP/VA S-630 is a 60:40 vinyl pyrrolidone/vinyl acetate copolymer which is obtainable from GAF (Great Britain) Co., Limited, Manchester. It is a spray-dried, high molecular weight powder which can form stable emulsions in water.

Antara 430 is a vinyl pyrrolidone/sytrene copolymer emulsion, also obtainable from GAF.

The results in Table 1 show the improved effect of the vinyl pyrrolidone/vinyl acetate and vinyl pyrrolidone/styrene coplymers in promoting adhesion in comparison with polyvinyl pyrrolidone (PVP). It is also shown that the former copolymer retains its adhesive characteristics during long term storage.

EXAMPLE 2

Tests were carried out to show that the vinyl pyrrolidone/vinyl acetate copolymer promoted peat adhesion to a wide range of legume seeds. Adhesion was measured in the same way as in Example 1. The results are shown in Table 2 below.

TABLE 2

| Legume seed | Control | Wt. of inoculant adhering to 100 g seed (mg) PVP VA-S-630 |
|---|---|---|
| Soya | 121 | 297 |
| Lupin | 144 | 265 |
| *Phaseolus vulgaris* | 165 | 382 |
| White clover | 94 | 215 |
| Lucerne | 284 | 416 |
| Chickpea | 148 | 259 |
| Lentil | 140 | 240 |
| Pea | 73 | 286 |

EXAMPLE 3

Similar experiments were carried out as in Example 1, except that the weight of vinyl pyrrolidone/vinyl acetate copolymer added to the peat was varied. The results are shown in Table 3 below, and indicate that the addition of between 5 and 7.5 g of the copolymer per 150 g of peat provides maximum adhesion.

TABLE 3

| Wt. of PVP VA-S-630 added to peat (g) | Wt. of peat adhering to 100 g seed (mg) |
|---|---|
| 0 (control) | 128 |
| 2 | 235 |
| 3.5 | 277 |
| 5 | 321 |
| 7.5 | 317 |
| 10 | 239 |

The copolymer may be added as a powder to dry peat prior to its sterilisation by gamma radiation, or added as an autoclaved 10% suspension during injection of the peat with a liquid bacterial suspension.

EXAMPLE 4

Rhizobial numbers were counted in inoculant compositions containing the vinyl pyrrolidone/vinyl acetate copolymer and in control compositions not containing the copolymer but otherwise identical. The results are shown in Table 4 below, and indicate that the number of bacteria in inoculants containing the copolymer are not adversely affected by its addition (i.e. it is not toxic). This applies both to fast (3622) and slow (3407) growing rhizobial strains. A similar result, also shown in Table 4, was obtained using the 3407 strain and Antara 430.

TABLE 4

| Bacterial strain | No. of Rhizobia $g^{-1}$ of peat | |
|---|---|---|
| | Control | PVP VA-S-630 |
| *Rhizobium phaseoli* 3622 | $1.22 \times 10^9$ | $1.50 \times 10^9$ |
| *Rhizobium japonicum* 3407 | $1.35 \times 10^9$ | $2.33 \times 19^9$ |
| | Control | Antara 430 |
| *Rhizobium japonicum* 3407 | $1.8 \times 10^{10}$ | $1.7 \times 10^{10}$ |

EXAMPLE 5

The follwing work was carried out to determine the effect of the copolymer on rhizobial numbers during long term storage of inoculants. The experimental procedure was as follows:

Selected sedge peat (Fisons) was adjusted to pH 6.5 using calcium hydroxide and calcium carbonate. This was oven dried at 60° C. and milled in a hammer mill to pass through a 0.4 mm sieve, 5 g aliquots of PVP VA-S-630 were added to 150 g lots of peat and the mixture sealed into 300 gauge polythene bags and sterilized by gamma radiation (50 kGy). These bags were subsequently injected with 57.5 ml of a grown culture of Rhizobium japonicum (3407) plus 57.5 ml of sterile distilled water. Controls (without the copolymer) were similarly prepared. Other irradiated peat packs were injected with 57.5 ml of grown culture plus 57.5 ml of an autoclaved 10% aqueous suspension of the copolymer. All packs were thoroughly mixed, cured at 26° C. for 7 days followed by storage at laboratory temperature. At periodic intervals the numbers of viable rhizobial cells in the inoculants were determined (Table 5).

TABLE 5

| Time after curing (months) | No. R. $g^{-1}$ peat | | |
|---|---|---|---|
| | Control | Copolymer (powder) | Copolymer (suspension) |
| 0 | $1.4 \times 10^9$ | $2.1 \times 10^9$ | $2.3 \times 10^9$ |
| 2 | $4.3 \times 10^9$ | $5.8 \times 10^9$ | $5.5 \times 10^9$ |
| 5 | $9.6 \times 10^9$ | $1.9 \times 10^{10}$ | $2.2 \times 10^{10}$ |
| 9 | $2.9 \times 10^{10}$ | $3.0 \times 10^{10}$ | $2.4 \times 10^{10}$ |
| 14 | $1.6 \times 10^{10}$ | $3.2 \times 10^{10}$ | $2.9 \times 10^{10}$ |

Rhizobial numbers in control inoculants (-PVP VAS-630) peaked after approximately nine months of storage and a slight decline was observed after a further five months. Although rhizobial numbers in inoculants containing the copolymer were similar to the controls after nine months storge, numbers were maintained during the subsequent five months. This demonstrated that the addition of the copolymer to peat based inoculants has no detrimental effect on rhizobial numbers.

EXAMPLE 6

This demonstrates the beneficial effect of the copolymer on rhizobial survival on the seed surface. The experimental details are as follows:

Rhizobial inoculants (without the copolymer) were prepared as described in Example 5. Inoculants containing PVP VA-S-630 were prepared by its addition as an autoclaved suspension. The control and copolymer containing inoculants contained $6\times10^9$ and $7\times10^9$ rhizobia $g^{-1}$ respectively at use. The control inoculants were used to inoculate soybean seeds in three ways:

1. Dry dusting—300 g of seed were mixed with 1 gm of inoculant
2. Water slurry—1 gm of inoculant was slurried with 2 ml of water and then mixed with 300 g of seed
3. Gum Arabic slurry—1 gm of inoculant was slurred with 2 ml of a 40% aqueous solution of gum arabic (Sigma) and then mixed with 300 g of seed In all treatments, inoculated seeds were held at room temperature for 30 min. prior to the removal of unadhered inoculant by sieving.

The inoculants containing PVP VA-S-630 were used in the following way:

1. Dry—1 g of inoculant was mixed with 300 g of seed
2. Moist—g of seed were slightly moistened with 0.3 ml of water, prior to mixing with 1 g of inoculant.

Inoculated seed was dried and sieved as before. The seed lots were then held in air or air dried soil at 25° C. or 35° C. and rhizobial numbers seed $^{-1}$ determined during an 8 day period. The results are shown in Table 6.

TABLE 6

| Time after inoculation (days) | No. R. seed$^{-1}$ Soil 25° | Soil 35° | Air 25° | Air 35° |
|---|---|---|---|---|
| | Control Inoculant Dry Dusting | | | |
| 0-2600 | | | | |
| 1 | 140 | 0 | 240 | 0 |
| 2 | 100 | 0 | 0 | 0 |
| 4 | 0 | 0 | 0 | 0 |
| 8 | 0 | 0 | 0 | 0 |
| | Water Slurry | | | |
| 0-20,600 | | | | |
| 1 | 1200 | 350 | 3000 | 0 |
| 2 | 1000 | 60 | 2000 | 0 |
| 4 | 0 | 0 | 0 | 0 |
| 8 | 0 | 0 | 0 | 0 |
| | Gum Arabic Slurry | | | |
| 0-73,000 | | | | |
| 1 | 13000 | 5200 | 31000 | 1300 |
| 2 | 9000 | 1300 | 2700 | 80 |
| 4 | 5600 | 200 | 1000 | 0 |
| 8 | 600 | 0 | 10 | 0 |
| | Inoculant containing PVP-VA-S-630 Dry | | | |
| 0-34,000 | | | | |
| 1 | 10000 | 1700 | 16000 | 1400 |
| 2 | 7500 | 860 | 9500 | 1100 |
| 4 | 5000 | 100 | 7500 | 200 |
| 8 | 830 | 0 | 900 | 10 |
| | Moist | | | |
| 0-79,000 | | | | |
| 1 | 50000 | 8000 | 43000 | 10000 |
| 2 | 11000 | 3400 | 32000 | 4300 |
| 4 | 11000 | 1000 | 8000 | 3600 |
| 8 | 4000 | 400 | 6300 | 700 |

From the results, it can be seen that rhizobial numbers declined rapidly in all treatments when control inoculants were used for dry dusting or water slurry inoculation. Gum arabic (a conventional sticker) offered protection to the rhizobial cells, thus extending their survival time, but this protection was inferior to that provided by the copolymer.

This superiority of the copolymer over gum arabic in promotion of rhizobial survival on the seed surface becomes plainly obvious when the data obtained with the conventional sticker is compared to moist inoculation using the copolymer—i.e. both treatments providing similar initial rhizobial numbers seed$^{-1}$.

EXAMPLE 7

Slurry inoculation of seeds was carried out using a conventional inoculant composition as a control, a conventional composition with gum arabic as a sticker, and a composition according to the invention without a sticker. The results are shown in Table 7 below, and indicate that the copolymer increases inoculant adhesion during slurry inoculation of seeds, thus eliminating the need for an additional sticker.

TABLE 7

| Treatment | Increase in seed wt. (g) |
|---|---|
| Slurry with water | 0.62 |
| Slurry with 40% soln. of gum arabic | 1.10 |
| Slurry PVP VA-S-630 containing inoculant with water | 1.05 |

We claim:

[1. A seed having a coating comprising at least one species of microorganism having a beneficial effect on the seed or resulting plant, and a copolymer of (1) vinyl pyrrolidone and (2) vinyl acetate or styrene or a substituted styrene.]

[2. An inoculant composition for plants, comprising a carrier medium, at least one species of microorganism having a beneficial effect on the plants, and a copolymer of (1) vinyl pyrrolidone and (2) vinyl acetate or styrene or a substituted styrene.]

[3. The composition of claim 2, wherein the plants are legume crops and said microorganism is Rhizobium bacteria.]

[4. The composition of claim 2, wherein said carrier medium is peat.]

[5. The composition of claim 3, wherein said carrier medium is peat.]

[6. The composition of claim 2, wherein said copolymer is a copolymer of viyl pyrrolidone and vinyl acetate in respective proportions by weight of from 50:50 to 70:30.]

[7. The composition of claim 3, wherein said copolymer is a copolymer of vinyl pyrrolidone and vinyl acetate in respective proportions by weight of from 50:50 to 70:30.]

[8. The composition of claim 4, wherein said copolymer is a coplymer of vinyl pyrrolidone and vinyl acetate in respective proportions by weight of from 50:50 to 70:30.]

[9. The composition of claim 5, wherein said copolymer is a copolymer of vinyl pyrrolidone and vinyl acetate in respective proportions by weight of from 50:50 to 70:30.]

*10. A seed having a coating consisting essentially of at least one species of microorganism selected from the group consisting of bacteria of the genera Rhizobium, Bacillus,*

*Azotobacter, Arthrobacter, Pseudomons, Azospirillium, Cyanobacteria, and mycorrhizal fungi having a beneficial effect in the seed or resulting plant, and a copolymer selected from the group consisting of (1) a copolymer of vinyl pyrrolidone and vinyl acetate in respective proportions by weight of from 50:50 to 70:30, (2) a copolymer of vinyl pyrrolidone and styrene, and (3) a copolymer of vinyl pyrroldione and a substituted styrene.*

*11. The seed of claim 10, wherein said seed is the seed of a legume crop plant and said microorganism is a Rhizobium bacteria.*

*12. The seed of claim 10, wherein said copolymer is a copolymer of vinyl pyrrolidone and vinyl acetate in respective proportions by weight of 50:50 to 70:30.*

*13. The seed of claim 10, wherein said copolymer is a copolymer of vinyl pyrrolidone and styrene.*

*14. The seed of claim 10, wherein said copolymer is a copolymer of vinyl pyrrolidone and a substituted styrene.*

*15. An inoculant composition for plants, consisting essentially of a carrier medium, at least one species of microorganism selected from the group consisting of bacteria of the genera Rhizobium, Bacillus, Azotobacter, Arthrobacter, Pseudomonas, Azospirillum, Cyanobacteria, and mycorrhizal fungi having a beneficial effect on the plants, and a copolymer selected from the group consisting of (1) a copolymer of vinyl pyrroldione and vinyl acetate in respective proportions by weight of from 50:50 to 0:30, (2) a copolymer of vinyl pyrrolidone and styrene, and (3) a copolymer of vinyl pyrrolidone and a substituted styrene.*

*16. The composition of claim 15, wherein said plants are legume plants and said microorganism is a Rhizobium bacteria.*

*17. The composition of claim 15, wherein said carrier medium is peat.*

*18. The composition of claim 16, wherein said carrier medium is peat.*

*19. The composition of claim 15, wherein said copolymer is a copolymer of vinyl pyrroldione and vinyl acetate in respective proportions by weight of from 50:50 to 70:30.*

*20. The composition of claim 16, wherein said copolymer is a copolymer of vinyl pyrrolidone and vinyl acetate in respective proportions by weight of from 50:50 to 70:30.*

*21. The composition of claim 15, wherein said copolymer is a copolymer of vinyl pyrrolidone and styrene.*

*22. The composition of claim 16, wherein said copolymer is a copolymer of vinyl pyrrolidone and styrene.*

*23. The composition of claim 15, wherein said copolymer is a copolymer of vinyl pyrrolidone and a substituted styrene.*

*24. The composition of claim 16, wherein said copolymer is a copolymer of vinyl pyrrolidone and a substituted styrene.*

* * * * *